W. P. BRADLEY.
Refrigerator.
No. 196,330. Patented Oct. 23, 1877.
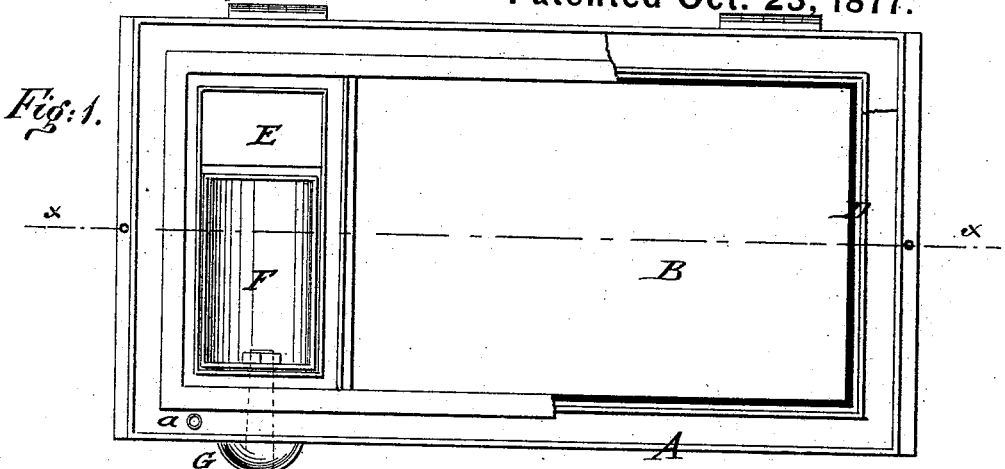
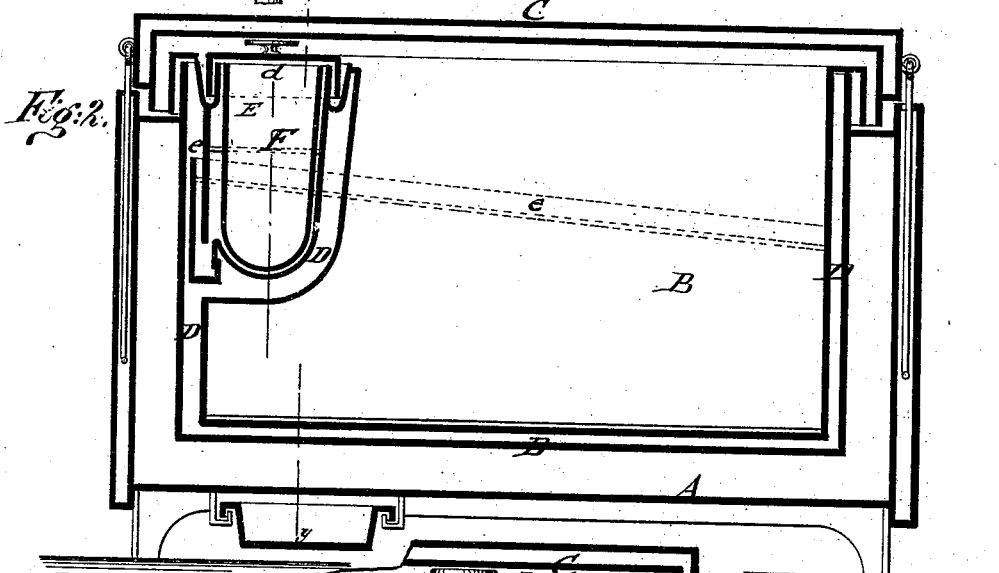
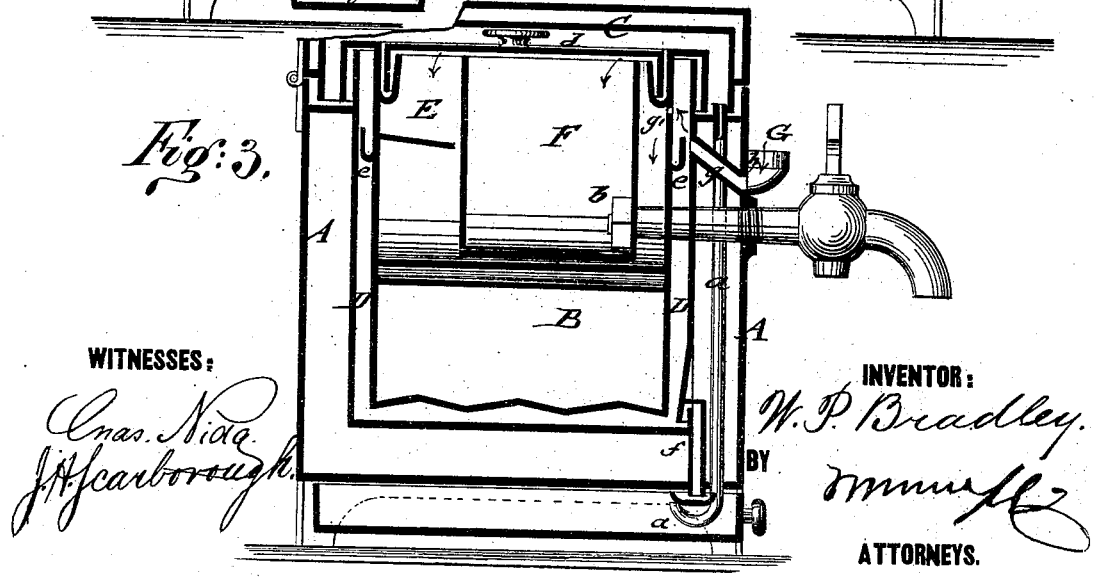
WITNESSES:
INVENTOR:
W. P. Bradley.
BY
ATTORNEYS.

UNITED STATES PATENT OFFICE.

WILLIAM P. BRADLEY, OF MOBILE, ALABAMA, ASSIGNOR TO HIMSELF AND JULIUS LOWENTHAL, OF SAME PLACE.

IMPROVEMENT IN REFRIGERATORS.

Specification forming part of Letters Patent No. 196,330, dated October 23, 1877; application filed June 18, 1877.

*To all whom it may concern:*

Be it known that I, WILLIAM P. BRADLEY, of Mobile, in the county of Mobile and State of Alabama, have invented a new and Improved Refrigerator, of which the following is a specification:

In the accompanying drawing, Figure 1 represents a top view of my improved refrigerator, with cover removed to show interior construction. Fig. 2 is a vertical longitudinal section of the same on line $x\,x$, Fig. 1; and Fig. 3, a vertical transverse section on line $y\,y$, Fig. 2.

Similar letters of reference indicate corresponding parts.

The object of this invention is to furnish an improved refrigerator and water-cooler combined, in which the cooling influence of the ice is utilized in a superior manner, so as to reduce the consumption of ice to a minimum and decrease the expense for the same; and the invention consists of a main box and an interior box, forming an intermediate cold-air space therewith, and closed by a water-joint of the inner box and cover. The inner box is provided with an ice-chamber and water-cooler, having a separate water-joint for their cover. The melted ice-water is collected around the water-cooler and conducted alongside troughs of the inner box to the bottom of the main box, where it is drawn off by a suitable trap into a water-receptacle below the same. An air-trap supplies air to the space between the main and inner box and to the water-cooler, to admit the water to run.

In the drawing, A represents the main box, which is made, in the usual manner, of double walls, and filled with a suitable non-conductor of heat. B is the interior box, which rests, by a top flange, on the upper part of the main box, that has a recess for being filled with water, so as to form a water-joint with the inner box and with the hinged cover C.

The surplus water is drawn off from the top recess of the main box by an overflow-pipe, $a$, that extends down to the bottom of the main box, so as to prevent the splashing of the water when the lid is closed. A small siphon-pipe, at the lower end of the overflow-pipe, forms a liquid seal, for preventing the air from entering through that pipe.

Between the main and inner box is formed a cold-air space, D, that acts as an additional non-conductor to the exterior heat, and serves to keep the side walls of the inner box cool.

The box B is provided with a small ice-receptacle, E, and in front of the same with a detachable water-cooler, F, through which the water is drawn off by a faucet that passes through the outer and inner box and is screwed into the main box, and secured at the inner end to the cooler by a nut, $b$, as shown in Fig. 3. By unscrewing the nut and removing the faucet the cooler may be taken out for cleaning.

The ice-receptacle and water-cooler are closed hermetically in analogous manner as the main box and cold air-space, by a lid, $d$, and water-joint around the same. The cold-air space D is also extended around the water-cooler and ice-box, and the melting ice-water collected at the bottom of the same rising up to a certain height around the same, and being then conducted over the rim and along inclined side troughs $e$ at the outside of the inner box B to the lower part of the main box, where it fills the same up to a certain level, so that the corrugated bottom of the inner box is brought in contact with the water and kept cool thereby.

The water-level in the lower part of the box is controlled by a siphon-trap, $f$, which draws off the water to the receptacle below the box without admitting air.

The water-cooler F and ice-box E, being surrounded by a cold-water and a cold-air space, are inclosed in twofold manner, and produce the slow melting of the ice, under exclusion of the atmospheric air, by the water-joints of the main box and cooler. Only so much air is drawn into the main box and cooler as to admit the free flow of the water, either through the faucet or the bottom valve, the air being supplied through an air-trap, G, that is arranged above the faucet and provided with an inclined conducting-tube, $g$, that passes through the main box A to the cold-air space, and from the same, through a supply-hole, $g'$, into the water-cooler.

The cup-shaped trap G is filled with water up to a level somewhat above the tongue $h$, formed by the upper angular jointing-edge of the outer wall of the main box and of tube $g$, so that as soon as the water is drawn off, either through the water-trap at the bottom or through the faucet, the pressure of the atmospheric air reduces the level of the water in the trap G below the tongue, and admits the entrance of air to the interior. The air cannot enter into the refrigerator except in the manner described, so that a uniform low temperature is retained therein for preserving all kinds of articles with but a small consumption of ice, furnishing thereby a very economical and efficacious refrigerator for cooling and preserving purposes. The water-trap may also be used in connection with the common water-cooler and other vessels closed by a liquid seal.

Having thus described my invention, I claim as new, and desire to secure by Letters Patent—

1. A refrigerator made of an outer main box, A, and detachable interior box B, forming a cold-air space, D, between the outer and inner box, and being closed by a lid, C, and water-joint, substantially in the manner and for the purpose set forth.

2. The interior box B, having ice-receptacle E and water-cooler F, closed by a lid and water-joint, and surmounted by a cold-water space and cold-air space, substantially as described.

3. The interior box B, having ice-receptacle E, with surrounding cold-water space and inclined conducting side troughs, substantially as specified.

4. The combination of the interior box B, having ice receptacle E and inclined conducting-troughs, with the main box A, having water-trap $f$ at a level with the bottom of inner box, substantially as and for the purpose described.

5. The combination of a refrigerating-vessel, closed by a liquid seal, with an air-trap, G, substantially as specified.

6. The combination of the cold-air space D between main and interior box, and of liquid-sealed water-cooler and ice-box, having opening $g'$ near top, with the air-trap G, having inclined air-tube $g$ and tongue $h$, to admit air for admitting flow of water, substantially as and for the purpose set forth.

WILLIAM P. BRADLEY.

Witnesses:
LOUIS KASSENS,
ALFRED A. SASSAMAN.